United States Patent [19]

Blessing et al.

[11] 4,171,575

[45] Oct. 23, 1979

[54] ACTUAL SEW LENGTH MEASURING DEVICE

[75] Inventors: Hubert Blessing, Dallas; James E. Hiegel, Plano; William R. Rathkamp, Richardson, all of Tex.

[73] Assignee: Levi Strauss & Co., San Francisco, Calif.

[21] Appl. No.: 894,030

[22] Filed: Apr. 6, 1978

[51] Int. Cl.² ............................ G01B 3/12; G01B 5/04
[52] U.S. Cl. ................................ 33/134 R; 33/141 E; 112/121.26
[58] Field of Search ............ 33/134 R, 134 A, 141 R, 33/141 E, 141 D, 129, 142; 226/90; 112/121.11, 121.26

[56] References Cited

U.S. PATENT DOCUMENTS

| | | | |
|---|---|---|---|
| 1,468,145 | 9/1923 | Entriken | 33/134 R |
| 2,600,336 | 6/1952 | Scivally | 33/134 R X |
| 3,688,410 | 9/1972 | Zeidler et al. | 33/142 |
| 3,838,519 | 10/1974 | Chick | 226/90 |
| 3,980,032 | 9/1976 | Kleinschmidt et al. | 112/121.11 |

*Primary Examiner*—William D. Martin, Jr.
*Attorney, Agent, or Firm*—Limbach, Limbach & Sutton

[57] ABSTRACT

The lengths of one or more fabric workpieces are measured by rolling a toothed measuring wheel over each fabric workpiece as it is passed through a sewing machine and conveying the revolutions of the measuring wheel to an electronic, digital counter by means of a torsion shaft whose flexibility is tuned such that while coacting with a friction brake at the counter, no reverse motion will occur due to relaxation in the fabric tension.

4 Claims, 8 Drawing Figures

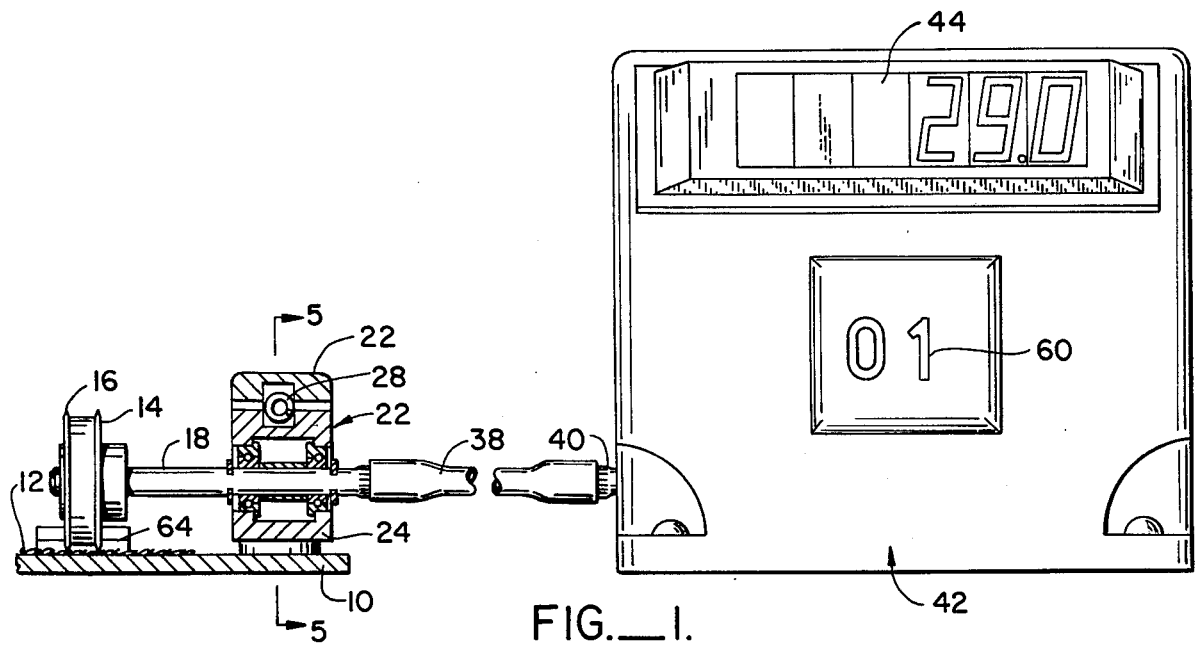
FIG._1.
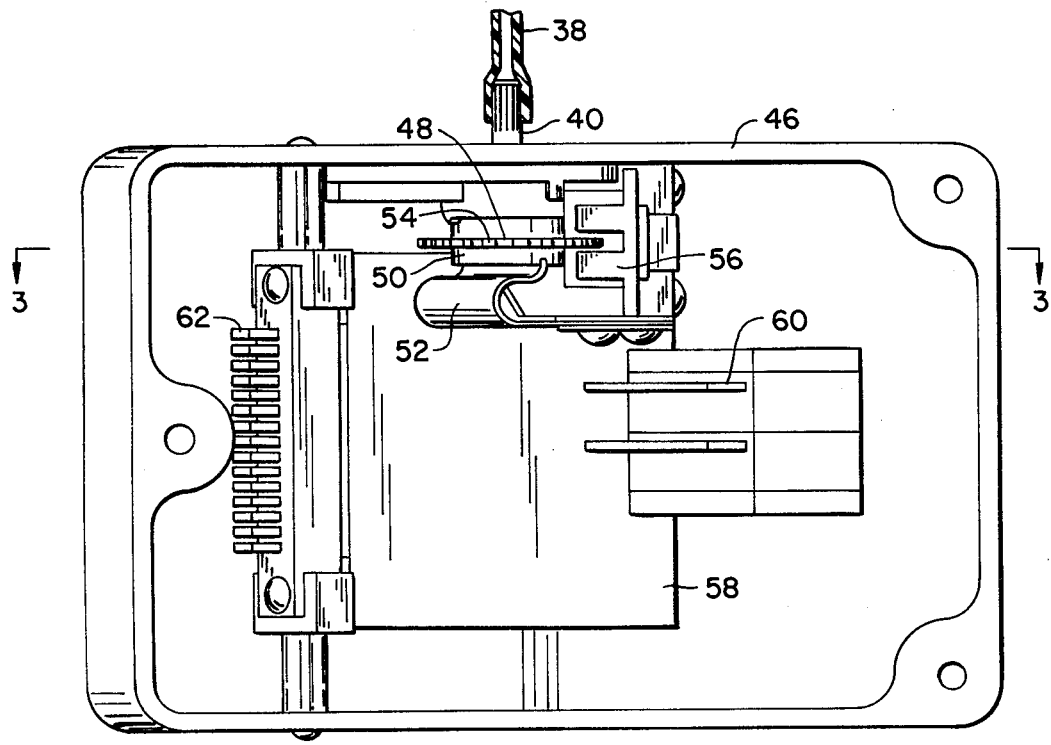
FIG._2.

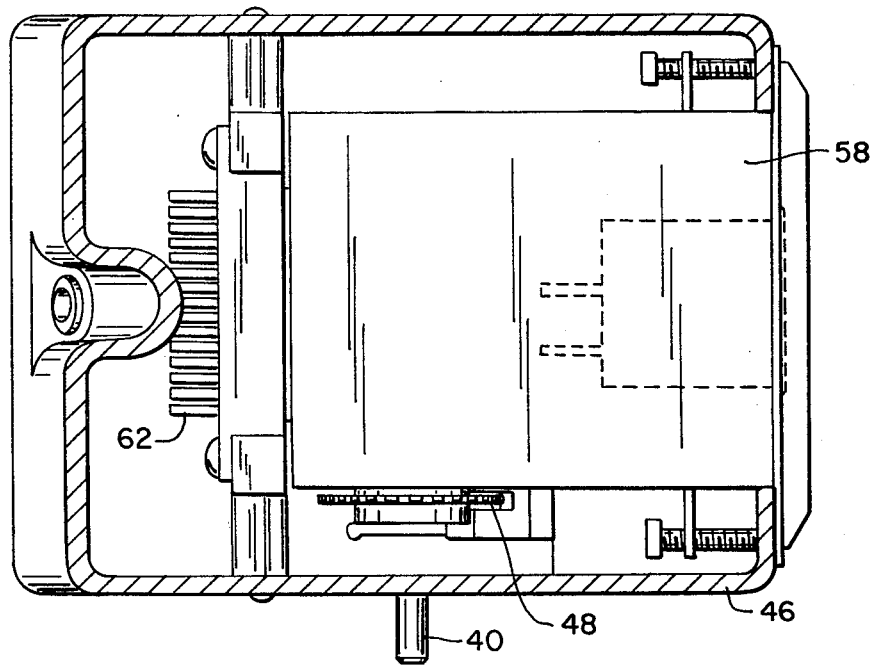
FIG._4.
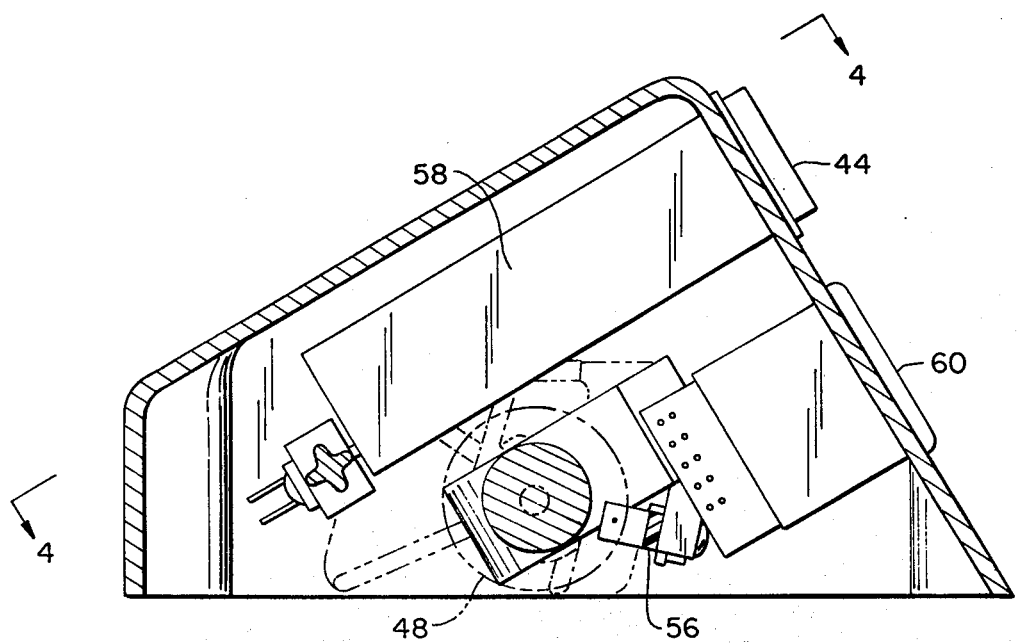
FIG._3.

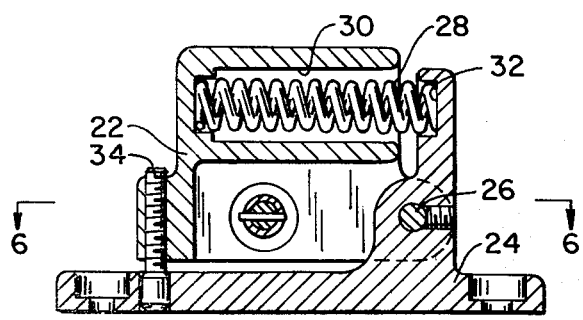
FIG._5.
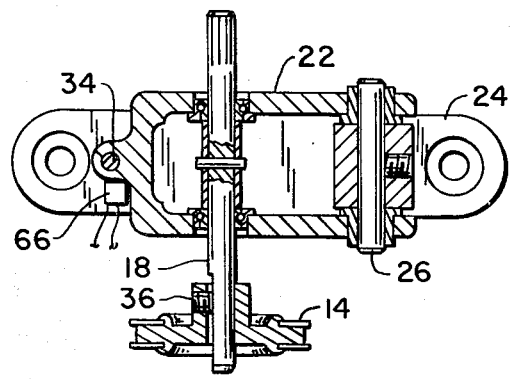
FIG._6.
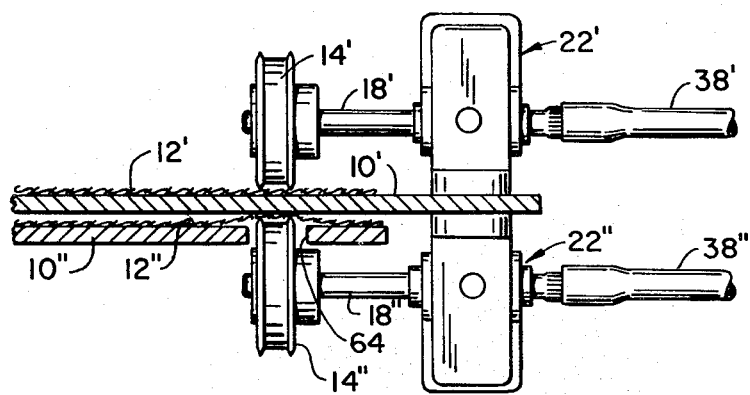
FIG._7.

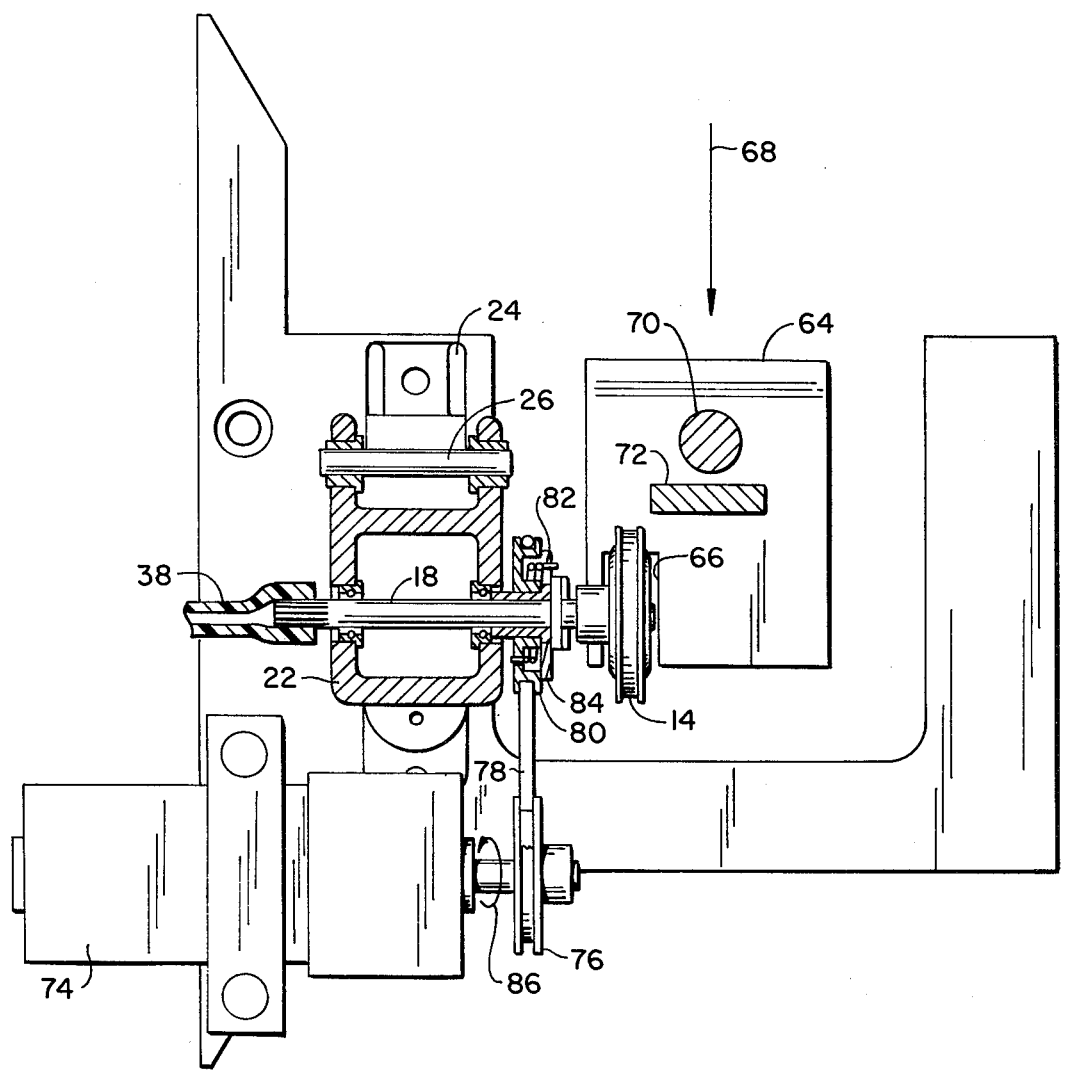
FIG._8.

ACTUAL SEW LENGTH MEASURING DEVICE

BACKGROUND OF THE INVENTION

This invention relates to a fabric length measuring device and more particularly to a device for measuring the length of a fabric workpiece as it is sewn by a sewing machine.

During a fabric sewing operation it is sometimes desirable to measure the length of the fabric workpiece which is sewn. When a sewing machine is operated at a relatively low speed, this could possibly have been done by mechanical counters such as that disclosed in U.S. Pat. No. 1,468,145 (Entriken). With the advent of high speed, commercial sewing machines, however, such mechanical measuring devices are not suitable. In a present day commercial sewing machine the fabric workpiece is accelerated and decelerated by the feed dogs at rates as high as 7,000 times per minute, moving in increments of one tenth to one seventh of an inch at a time. Mechanical prior art counters have inertial constraints and torque requirements which can not meet these specifications. Furthermore, the material subsequent to a stitch in the area behind the needle, while relaxing during deceleration, literally moves backwards to some extent. With some prior art counters this has the effect of adding to the measurement which is being made; producing an inaccurate count.

SUMMARY OF THE INVENTION

The above-mentioned disadvantages of prior art devices are overcome and limp, semielastic workpieces, such as fabric workpieces, passing through a work station can be measured at high rates of acceleration and deceleration with the apparatus of the present invention which comprises a measuring wheel, means for rotatably supporting the measuring wheel at the output of the work station and for biasing the measuring wheel to roll against the workpiece during the sewing operation, and an incremental indicator, such as an electronic counter, connected to the measuring wheel so as to be advanced by the wheel's rotations. The torsion shaft is attached at one end to the measuring wheel and at the other end to a pulse wheel within the indicator. As the measuring wheel is rotated by the workpiece passing beneath it, the torsion shaft transmits this torque to the pulse wheel. A sensor senses the rotation of the pulse wheel and provides a count. This count is representative of the incremental rotation of the measuring wheel and hence of the distance (length) over which the wheel rolled.

One form of the pulse wheel has a plurality of regularly spaced apart apertures about its circumference. A photo-optic sensor is aligned with the pulse wheel edge to shine light through the apertures and to thus sense movement of the apertures as the pulse wheel is rotated in synchronism with the measuring wheel. The pulse wheel sensor generates a pulse output signal representative of the number of apertures passing by it. These pulses are counted by an electronic digital counter and are displayed on a conventional electronic display device such as an LED display or a liquid crystal display. The ratio of the pulse wheel apertures to the measuring wheel circumference is such that the spacing between apertures represents a unit of measurement, such as 0.05 inches. Each unit of measurement counted can be displayed as an equivalent length. Multiples of counts, such as 0.1 inches, can also be displayed. Other types of pulse wheel generators would be equally suitable.

A friction brake is pressed against the pulse wheel to exert a predetermined drag force. The torsion shaft is tuned such that while coacting with the friction brake no reverse motion of the pulse wheel will occur due to relaxation of the fabric tension. In one embodiment, the tuned natural torsional frequency of the connected shaft, while coacting with the friction brake, is at least 7,000 cycles per minute. At this natural torsional frequency the shaft is maximally flexible.

In the preferred embodiment, the indicator further includes means for manually subtracting from the pulse count number to allow for calibration. This is necessary because of changes in the texture of the material and with the amount of sizing impregnated in the material. In the operation of the invention, the sewing operator makes a selection out of a bundle of workpieces to be sewn and, subsequent to sewing the selected workpiece, actually measures its length by conventional means. While the piece is sewn, its length is measured with the apparatus of the invention. Discrepancies between the two measurements are then accounted for by this calibration feature. Also a predetermined amount of overlap can also be subtracted by this feature.

In another embodiment of the invention a pair of the measuring apparatus are utilized to simultaneously monitor and measure the lengths of two separate workpieces which are being attached together, such as by sewing them. By watching both displays, or a single display of the difference of the measurements, the operator can determine what sort of corrective action is needed to control the lengths of the fabric workpieces as they are attached together, i.e., one of the workpieces can be held back with respect to the other.

In still other applications it is desirable to give a count display to the sewing machine operator while the measurement device is measuring subsequent lengths of the material. Thus, for example, when sewing a waist band of material between the back and side seams, it is desirable that the two lengths of material between the seams be of equal length or have some fixed ratio with respect to each other. In this embodiment, a transducer or micro-switch on the measuring wheel support is opened when the wheel rides over the first side seam, the back seam and the second side seam. The switch is connected to control the counter such that the lengths between any one of these seams, or any combination of them, can be displayed on the counter of this embodiment while the unit is simultaneously measuring the next length of material passing through the sewing machine. In this way, the sewing machine operator can read the present measurement while sewing and compare it against the last measurement at that point to take corrective action for controlling the lengths.

It is, therefore, an object of the present invention to provide an actual sew length measuring device which is capable of accurately measuring material sewn at frequencies as required by modern high speed sewers, i.e., 7,000 R.P.M.

It it still another object of the invention to provide means for measuring the length of a fabric workpiece while it is being sewn and to simultaneously display that measurement for the sewing machine operator.

It is a still further object of the invention to provide a fabric workpiece length monitoring system which is capable of independently monitoring the lengths of two fabric workpieces being sewn together.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a vertical view, partly in section, of a sew length measuring apparatus according to one embodiment of the invention;

FIG. 2 is an enlarged, horizontal, sectional view of the measurement indicator of the invention depicted in FIG. 1;

FIG. 3 is an enlarged, vertical sectional view of the measurement indicator, as depicted in FIG. 2, taken generally along the lines 3—3 of FIG. 2;

FIG. 4 is an enlarged, inclined sectional view of the measurement indicator, taken generally along the lines 4—4 of FIG. 3;

FIG. 5 is an enlarged, vertical, sectional view of the shaft support block for the measuring wheel of the embodiment depicted in FIG. 1 and is taken along the lines 5—5 of FIG. 1;

FIG. 6 is an enlarged, horizontal, sectional view taken generally along the lines 6—6 of FIG. 5;

FIG. 7 is an enlarged, vertical, sectional view of a second embodiment of the invention, with portions broken away; and FIG. 8 is a horizontal view, partly in section and with portions broken away of a modified embodiment of the invention.

DETAILED DESCRIPTION OF CERTAIN PREFERRED EMBODIMENTS

Referring now more particularly to FIG. 1, a limp fabric workpiece 12 rests on a horizontal workpiece support surface 10 which is part of an overall work station for processing the workpiece. An example of a typical such work station would be where a waistband part is sewn for incorporation into a pair of pants. The workpiece 12 is oscillated by the feed dog 13 of a sewing machine (not shown) at a predetermined frequency. The measuring wheel 14 is preferably located downstream of the feed dog 13. In the garment field, this frequency can be as high as 7,000 cycles per minute.

A measuring wheel 14 having a plurality of spines or teeth 16 about its circumference rolls against the workpiece 12. The measuring wheel 14 is fixedly mounted on a shaft 18 which is rotatably supported in a bearing support 22. The bearing support 24 is bolted to the work surface 10.

Referring more particularly to FIG. 5, it can be seen that the shaft support structure 22 resiliently biases the measuring wheel 14 into rolling engagement with the workpiece 12. This is accomplished by having a stationary part of the shaft support 24 and a pivoted or hinged part 22. The part 22 is hinged to the part 24 by means of a horizontal pin 26 passing through both members and carries the shaft 18. A coil spring 28, one end of which is received in a cavity 30 in the hinged part 22 and the other end of which rests in a recess 32 in the part 24, biases the hinged part 22 to lower the shaft 18 until the measuring wheel is against the workpiece 12. An adjustment screw 34 threaded in the hinged part 22 and bearing against the stationary part 24 allows adjustment of the height, and hence of the pressure, of the measuring wheel with respect to the workpiece 12. As best viewed in FIG. 6, it can be seen that the measuring wheel 14 is keyed to the shaft 18 by means of a set screw 36. The end of the shaft 18 on the opposite side of the support block 22 from the wheel 14 is splined to receive a tube 38 of flexible material.

The other end of the tube 38 is connected to the input shaft 40 of an increment counter and indicator 42. The unit 42, as will be explained in greater detail hereinafter, includes an electronic counter 58 having a display 44 on the face of the housing 46. Thumb wheel switches 60 on the face of the housing 46 allow the counter 58 to be calibrated.

Referring now more particularly to FIGS. 2, 3 and 4, the construction of the unit 42 is illustrated. The input shaft 40 is rotatably supported in a sidewall of the casing 46. The other end of the shaft 40 opposite from the tube 38 is attached to a print wheel 48 which has a plurality of apertures 54 about its circumference. A disc brake 50 bears against the flat side of the pulse wheel 48 opposite from the end of the shaft 40. A spring 52 presses the disc brake 50 against the pulse wheel 48. The spring 52 is attached to the casing 46. The purpose of the disc brake 50 is to provide frictional drag on the pulse wheel 48 to help prevent it from rotating backwards while the tube 38 and the workpiece 12 relax subsequent to deceleration of the workpiece, which would add to the count within the unit 42, giving an erroneous reading.

The tube 38 when connected as described above and while coacting with the brake 50 is maximally flexible, i.e. tuned, at a predetermined force and oscillatory frequency to avoid reverse motion of pulse wheel 48 while the workpiece is accelerated and decelerated by the sewing machine. In one embodiment, the oscillatory frequency is at least 7,000 cycles per minute.

This tuning is accomplished in part by the selection of the material and length of the tube 38. An example of such a material is hollow, natural polyethylene plastic tubing, such as that made by Imperial Eastman, type No. 44-P. The free length of a typical one of such tubes 38 is two and three quarters inches. The inner diameter of the tubing is three sixteenths of an inch and the outside diameter is one quarter inch.

A photo-optic coupler sensor 56 straddles the outer circumference of the pulse wheel 48 and produces an electronic pulse output with the passing of each aperture 54 through the coupler 56. As can be seen in FIG. 2, the photo-optic coupler 56 is slotted in order to straddle the edge of the pulse wheel 48. The photo-optic coupler sensor 56 is connected by means of wires (not shown) to the high speed, electronic counter 58. The electronic counter 58 counts, in binary fashion, the pulses from the photo-optic coupler sensor 56 and displays a decimal count on the display 44. Since the counter 54 is a commercially manufactured item, its circuitry will not be described in any greater detail. An example of such a counter is counter Model No. PC-4, manufactured by Non-Linear Systems, Inc.

Due to variations in the size of the measuring wheel 12 as manufactured and due to changes in the thickness of the material and the amount of sizing impregnated in the material, there will be certain measurement variations among different devices and from one bundle of workpieces to the next. In order to calibrate a particular measuring apparatus for a particular bundle, the sewing machine operator sews out a test workpiece from a given bundle and actually measures the length of the sewn piece. This actual measurement is then compared against the measurement as displayed on the display 44.

Additionally, the operator may allow for a certain amount of overlap which would not appear on the display 44. The total calibration figure is then dialed in by means of the thumb switches 60 which are connected to the counter 58 in a manner so as to subtract from the counter 58. Since the circuitry to accomplish this calibration is well understood by those skilled in the art, it will not be described in further detail.

The counter 58 is supplied with the necessary voltages and inputs by means of printed circuit connectors 62. The power supplies and other necessary operative circuitry which are ordinarily used with such counters are not shown but they are understood to be included. Since they are common place and readily, commercially available they, also, will not be described in any greater detail.

In some operations it is desirable to sew two workpieces together, as for example, two panels of a pair of pants provided with a regular outseam. Ordinarily, the two panels are clamped together at two waist points and two cuff points and are then sewn together. With a modification of the present invention, it is only necessary to align the two leading points of the panels along the waist line and then continuously measure each individual panel as it enters the sewing machine so that the point where the cuff points are going to be in relation with each other after completion of the sew line can be predicted by means of the continuous measurement. Referring now more particularly to FIG. 7, the modification of the basic invention to accomplish this process is illustrated.

In this modification, a pair of monitoring apparatus are utilized. The corresponding reference numerals for the embodiment described above have been utilized for corresponding parts with primed and double-primed numbers. The first monitoring apparatus corresponds to that described above and measures a workpiece 12' on the top surface of a support surface 10'. This monitoring apparatus includes a measuring wheel 14' mounted on a shaft 18' rotatably supported in a block 22' and connected by a tube 38' to an indicator (not shown) which corresponds to the indicator 42 shown in FIG. 1. Beneath the support surface 10' is a second workpiece 12" supported on a support surface 10". Thus, the support surface 10' separates the two workpieces 12' and 12". The support surface 10" is provided with an aperture 64 through which a measuring wheel 14" passes to roll on the workpiece 12". The measuring wheel 14" is mounted on a shaft 18" rotatably supported in a block 22" and connected by means of a tube 38" to a second indicator (not shown) corresponding to the indicator 42. In contrast to the embodiment described in reference to FIG. 1, the measuring wheels 14' and 14" are mounted upstream of the upper or lower feed dogs 13' and 13", respectively.

With this pair of units 42 and 42', the operator can read the two independent measurements or a difference of the measurements simultaneously and can control, by holding back or releasing the individual workpieces 12' and 12" the rate at which the lengths are sewn together in accordance with the measurements.

In still other operations, the operator may require count displays for different portions of the sewn workpiece while measuring other portions. In order to accomplish this, a micro-switch 66 is mounted adjacent to the adjustment screw 34 on the hinged member 22 of the block 20. The operative portion of the micro-switch bears against the stationary member 24 and is closed when the member 22 is at its closest point to the member 24. When the measuring wheel 14 rides up and over a bump in the workpiece 12, the wheel lifts the shaft 18 which raises the member 22 against the force of the spring 28 and opens the switch 66. The switch 66 is connected to an input of the counter 58 such that when the switch is opened, the display on the counter at that time is retained. Meanwhile, the electronic portion of the counter 58 is continuing to count and simultaneously displays its count at a different part of the display 44 so that the operator can compare the two measurements in order to take corrective action.

The presser foot of the sewing machine, as well as the measuring wheel 14, exert a certain amount of drag force on the fabric workpiece 12, causing it to compress somewhat. This can cause erroneous readings to be made with some, highly compressible fabrics. In order to obviate this problem in one embodiment of the invention, the measuring wheel is given a biasing torque of sufficient magnitude and in a direction to exert a pulling force on the fabric workpiece which is just sufficient to overcome the drag forces and substantially eliminate any compression of the fabric workpiece.

Referring now to FIG. 8, the measuring wheel 14 is mounted on its shaft 18 rotatably supported in the block 22 positioned just to the side of a sewing machine presser foot 64. The wheel extends through a slot 66 in the presser foot to contact the workpiece (not shown). The direction of fabric feed beneath the presser foot 64 is shown by the arrow 68. A needle support holder 70 reciprocates one or more needles (not shown) through apertures in the presser foot 64. The presser foot is supported and spring loaded by a strut 72 connected to the sewing machine.

To provide the biasing torque to the measuring wheel 14, an electrical torque motor 74 generates a constant torque at its output pulley 76 which is connected by means of a belt 78 to a pulley hub 80. The hub 80 rotates freely on the shaft 18. Within the hub 80 is a coil spring 82 which is coiled about the shaft 18 and has one end attached to the shaft by means of a plate 84. The other end of the spring is attached to the hub 80. The direction of coil of the spring 82 and the direction of the torque applied by the motor 74 (as indicated by the arrow 86) is such that the spring is wound by the motor 74 and is unwound by rotation of the shaft 18 and the measuring wheel 14 in the direction of fabric flow. The purpose of the spring 82 is to provide a buffer between the acceleration and deceleration of the workpiece and the constant torque of the motor 74.

The torque of the motor is chosen to just balance the drag forces exerted on the fabric by the presser foot and the wheel 14. This arrangement does not interfere with the measuring function of the wheel 14 as described above.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. Apparatus for measuring the length of a semi-elastic, limp, planar workpiece passing through a work station which accelerates and decelerates the workpiece at the work station's frequency, the monitoring apparatus comprising:

a measuring wheel, means for rotatably supporting the measuring wheel and for biasing it to roll in engagement with the workpiece, counter means for counting and displaying incremental inputs, a two ended torsion shaft having a maximum torsional flexibility at or above the predetermined frequency, one end of the torsion shaft is connected to rotate with the measuring wheel and the other end of the torsion shaft is connected to advance the count of the counter means with each incremental rotation of the torsion shaft, and wherein the counter includes means for simultaneously displaying a plurality of pulse count numbers and further comprising a sensor for sensing the passage beneath the measuring wheel of a seam in the limp workpiece and for generating a control signal to the counter to cause the counter to hold constant at least one of the displayed pulse count numbers.

2. In combination, a work station which accelerates and decelerates a workpiece at a predetermined frequency and apparatus for measuring the length of a semi-elastic, limp, planar workpiece passing through the work station, the monitoring apparatus comprising:

a measuring wheel, means for rotatably supporting the measuring wheel and for biasing it to roll in engagement with the workpiece, counter means for counting and displaying incremental inputs, a two ended torsion shaft having a maximum torsional flexibility at or above the predetermined frequency, one end of the torsion shaft being connected to rotate with the measuring wheel and the other end of the torsion shaft being connected to advance the count of the counter means with each incremental rotation of the torsion shaft and wherein the counter means include a rotatable pulse wheel connected to the other end of the torsion shaft, sensor means adjacent to the pulse wheel for generating an electrical pulse signal for each predetermined increment of rotation of the pulse wheel, and a friction brake for engagement with the pulse wheel and for exerting a predetermined drag force on it, and wherein the torsion shaft coacting with the friction brake is tuned to prevent the pulse wheel from rotating backwards due to acceleration and deceleration of the workpiece at or below the predetermined frequency.

3. In combination, a work station which accelerates and decelerates a workpiece at a predetermined frequency while exerting frictional, drag forces on the workpiece and apparatus for measuring the length of a semi-elastic, limp, planar workpiece passing through the work station, the monitoring apparatus comprising:

a measuring wheel, means for rotatably supporting the measuring wheel and for biasing it to roll in engagement with the workpiece, counter means connected to the measuring wheel for counting and displaying each incremental rotation of the measuring wheel, and means for supplying a constant biasing torque to the measuring wheel sufficient to cause it to exert a pulling force on the workpiece wich nullifies the frictional forces exerted on the workpiece by the work station.

4. The combination as recited in claim 3 wherein the biasing torque means comprise a constant torque motor, a freely rotatable hub driven by the motor, and a coil spring connected between the hub and the measuring wheel for conveying the constant torque of the motor to the measuring wheel.

* * * * *